United States Patent
Zhou et al.

(10) Patent No.: US 7,236,004 B1
(45) Date of Patent: Jun. 26, 2007

(54) LOW VOLTAGE DIFFERENTIAL SIGNALING WITH OUTPUT DIFFERENTIAL VOLTAGE TO OUTPUT OFFSET VOLTAGE TRACKING

(75) Inventors: Shi-dong Zhou, Milpitas, CA (US);
Gubo Huang, Milpitas, CA (US)

(73) Assignee: XLINX, Inc., San Jose, CA (US)

( * ) Notice: Subject to any disclaimer, the term of this patent is extended or adjusted under 35 U.S.C. 154(b) by 100 days.

(21) Appl. No.: 11/238,780

(22) Filed: Sep. 29, 2005

(51) Int. Cl.
*H03K 19/003* (2006.01)

(52) U.S. Cl. .............................. 326/33; 326/32; 326/68; 327/539; 327/540

(58) Field of Classification Search ............ 326/32–33, 326/68, 90; 327/539–541, 543; 323/313–316
See application file for complete search history.

(56) References Cited

U.S. PATENT DOCUMENTS 5,774,013 A * 6/1998 Groe ........................... 327/543

7,127,368 B2 * 10/2006 Choi ........................... 702/130

OTHER PUBLICATIONS

U.S. Appl. No. 11/089,848, filed Mar. 24, 2005, Zhou et al.

* cited by examiner

*Primary Examiner*—Anh Q. Tran
(74) *Attorney, Agent, or Firm*—W. Eric Webostad (57) ABSTRACT

Apparatus and method for providing reference voltages for differential signaling with tracking of output differential voltage relative to output offset voltage are described. A swing reference voltage, an offset reference voltage, a swing feedback voltage, and an offset feedback voltage are obtained. Differences between pairs of these voltages are differentially amplified to produce first and second bias voltages. Pull-up and pull-down voltages are driven partially responsive to the first bias voltage and the second bias voltage to provide first and second control voltages. The first control voltage may be provided to a first resistance for the driving of the first pull-up and pull-down voltages. The second control voltage may be provided to a second resistance for the driving of the second pull-up and pull-down voltages. The first control voltage and the second control voltage may be provided to a third resistance.

18 Claims, 7 Drawing Sheets

LOW VOLTAGE DIFFERENTIAL SIGNALING WITH OUTPUT DIFFERENTIAL VOLTAGE TO OUTPUT OFFSET VOLTAGE TRACKING

FIELD OF THE INVENTION

One or more aspects of the invention relate generally to integrated circuits, and more particularly, to Low Voltage Differential Signaling ("LVDS") with tracking of output differential voltage.

BACKGROUND OF THE INVENTION

One type of high-speed data transmission interface that may be part of an integrated circuit is a Low Voltage Differential Signaling ("LVDS") interface. LVDS interfaces are well-known, and accordingly are not described in unnecessary detail herein. However, two important parameters of an LVDS interface are output differential voltage ("Vod") and output offset voltage ("Vos"). Vod is the voltage difference or swing voltage at two output terminals of an LVDS output driver. Vos is the average level of the voltage (or an offset voltage) at the two output voltage terminals. Vod and Vos can vary significantly due to variation in one or more of a semiconductor manufacturing process, supply voltage, and operating temperature, namely one or more variations in "PVT."

In order to provide an LVDS interface which is more stable with respect to one or more variations in PVT, others have suggested using a current mirror circuit as part of a corner bias circuit. An example of a current mirror corner bias circuit implementation is described in additional detail in a co-pending patent application entitled "Apparatus and Method for Low Current Differential Swing I/O Interface" by Shi-dong Zhou et al., assigned application Ser. No. 11/089,848, filed Mar. 24, 2005. In brief, in that implementation, a resistor is coupled between an input port of a differential amplifier and ground, and another input to the differential amplifier is a reference Vos. Thus, any amplified difference from the differential amplifier is dependent in part upon such resistor. This resistor is used to provide a base current, and the base current is provided to added current mirror circuitry, excluding any current mirroring done in input/output reference cells ("I/O dummy cells"). Moreover, the output of the differential amplifier is provided to this current mirror circuitry. However, because the resistor is conventionally formed using polycrystalline silicon sheet resistance ("a polyresistor"), it is subject to significant variation due to one or more changes in PVT. Furthermore, current mirrors may not completely mirror a current, and thus the current may not be completely mirrored for input into reference input/output drivers. Furthermore, polyresistor-induced error caused by one or more variations in PVT is mirrored, and potentially amplified, by such current mirror. Thus, a current mirror implementation for a standard LVDS interface with a target Vod of approximately 350 mV and a target Vos of approximately 1.25 V may have a Vod ranging from approximately 240 to 460 mV and a Vos ranging from approximately 1.24 V to 1.26 V. Notably, the percentage of Vod variation may be significant, which may impact reliability of such an LVDS interface.

Accordingly, it would be desirable and useful to provide an LVDS interface with a Vod that is less subject to PVT variation than the above-described LVDS interface and thus has a narrower Vod range.

SUMMARY OF THE INVENTION

One or more aspects of the invention generally relate to integrated circuits, and more particularly, to Low Voltage Differential Signaling ("LVDS") with tracking of output differential voltage ("Vod") relative to output offset voltage ("Vos").

An aspect of the invention is a reference voltage circuit for a differential interface. A first reference voltage source is configured to provide a reference swing voltage. A second reference voltage source is configured to provide a reference offset voltage. A first differential amplifier is coupled to receive the reference swing voltage and a first feedback voltage and is configured to provide a p-bias voltage responsive to the reference swing voltage and the first feedback voltage. A second differential amplifier is coupled to receive the reference offset voltage and a second feedback voltage and is configured to provide an n-bias voltage responsive to the reference offset voltage and the second feedback voltage. A first reference input/output cell is coupled to receive the p-bias voltage and the n-bias voltage and is configured to provide a first internal control voltage responsive in part to the p-bias voltage and the n-bias voltage. A second reference input/output cell is coupled to receive the p-bias voltage and the n-bias voltage and is configured to provide a second internal control voltage responsive in part to the p-bias voltage and the n-bias voltage. The first reference input/output cell is coupled to receive the second internal control voltage and is configured to provide the first internal control voltage responsive in part to the second internal output voltage. The second reference input/output cell is coupled to receive the first internal control voltage and is configured to provide the second internal control voltage responsive in part to the first internal control voltage. An internal resistance is configured to approximate transmission resistance and is coupled to receive the first internal control voltage at one end and to receive the second internal control voltage at another end. The first reference input/output cell and the second reference input/output cell are coupled together at a first node for providing a pull-up side reference voltage. The first reference input/output cell and the second reference input/output cell are coupled together at a second node for providing a pull-down side reference voltage.

Other aspects of the invention are method and apparatus for providing reference voltages for a differential interface. A swing reference voltage and an offset reference voltage are obtained. A swing feedback voltage and an offset feedback voltage are obtained. A first difference between the swing reference voltage and the swing feedback voltage is differentially amplified to produce a first bias voltage. A second difference between the offset reference voltage and the offset feedback voltage is differentially amplified to produce a second bias voltage. A pull-up voltage is gated responsive to the first bias voltage to at least in part provide a first control voltage and a first reference voltage, and a pull-down voltage is gated responsive to the second bias voltage to at least in part provide a second control voltage and a second reference voltage. The first control voltage and the second control voltage are provided to a resistance. The first control voltage and the second control voltage are cross-coupled via a first circuit and a second circuit respectively.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
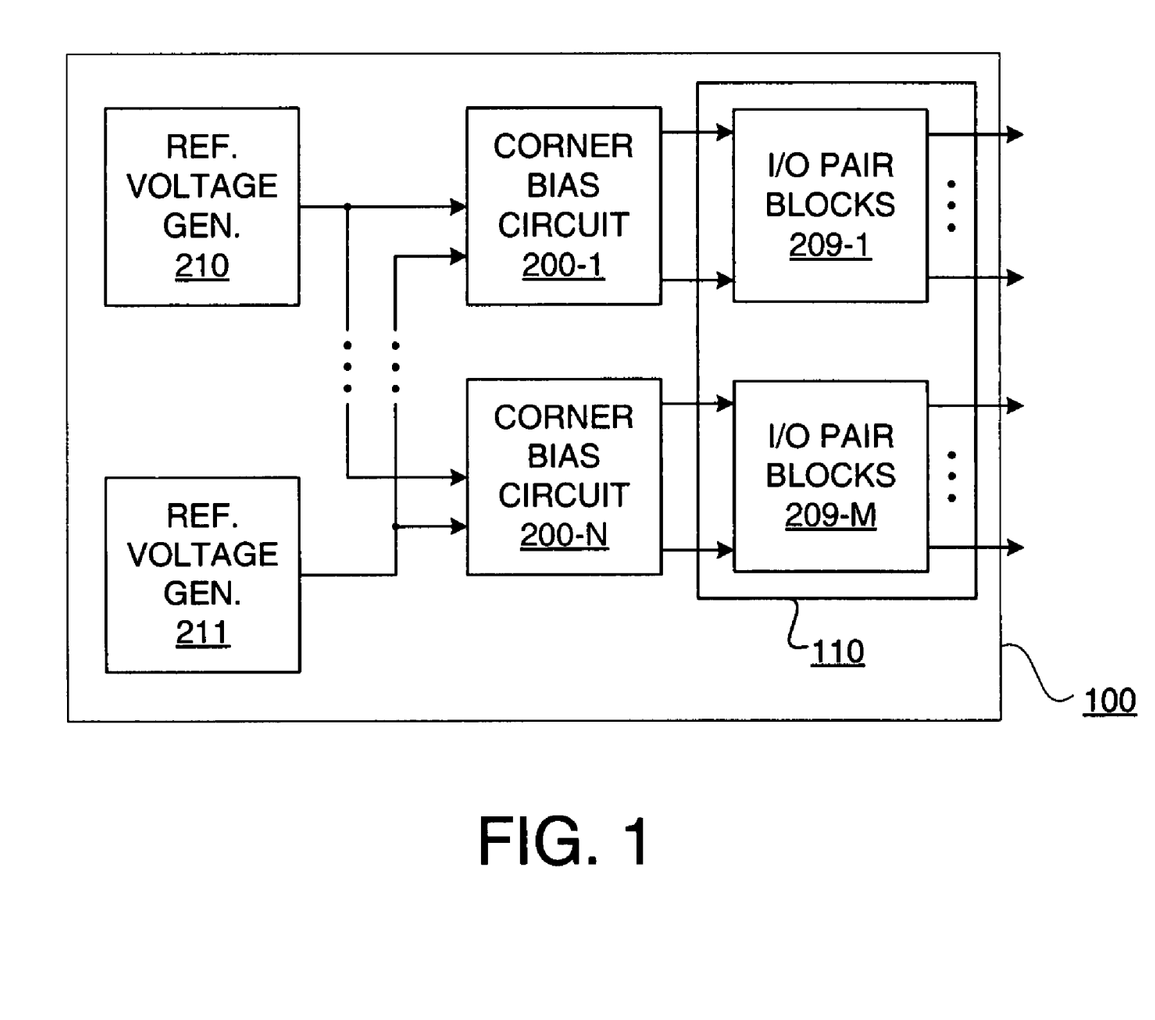
FIG. 1 is a high-level block diagram depicting an exemplary embodiment of an integrated circuit having a differential interface.

FIG. 1 is a high-level block diagram depicting an exemplary embodiment of an integrated circuit 100 having a differential interface 110. Differential interface 110 may include input/output ("I/O") pair blocks 209-1 through 209-M, for M a positive integer greater than one ("I/O pair blocks 209"). Each I/O pair block 209 provides a pair of differential output signals. For purposes of clarity by way of example and not limitation, it shall be assumed that differential interface 110 is an LVDS interface. However, other types of known interfaces using PMOS and NMOS reference voltages may be used.

PMOS and NMOS reference voltages may be provided to I/O pair blocks 209 from corner bias circuits 200-1 through 200-N, for N a positive integer greater than one ("corner bias circuits 200"). Notably, a corner bias circuit 200 may be used to provide PMOS and NMOS reference voltages to more than one I/O pair block, and thus M may be larger than N.

A reference voltage generator 210 may be configured to provide a reference voltage for Vos to at least one corner bias circuit 200. A reference voltage generator 211 may be configured to provide a reference voltage for Vod to at least one corner bias circuit 200.

Figure 2:
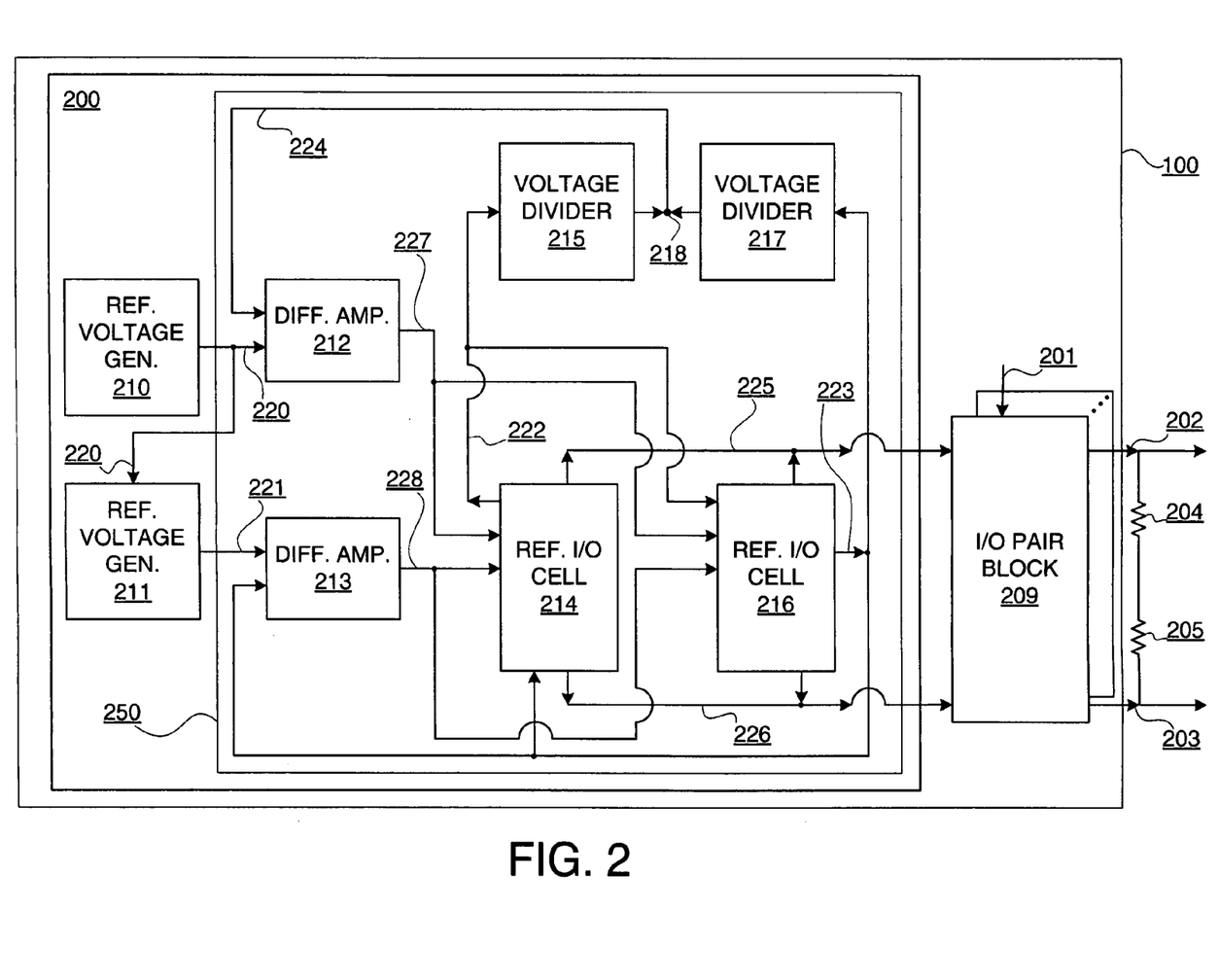
FIG. 2 is a high-level block diagram depicting an exemplary embodiment of the integrated circuit of FIG. 1 having a corner bias circuit coupled to one or more I/O pair blocks.

FIG. 2 is a high-level block diagram depicting an exemplary embodiment of an integrated circuit 100 having a corner bias circuit 200 coupled to an I/O pair block 209. Notably, there may be more than one I/O pair block 209, but for purposes of clarity and not limitation only a single I/O pair block 209 is described for this example. Corner bias circuit 200 includes feedback control circuit 250 and reference voltage generators 210 and 211. Feedback control circuit 250 includes differential amplifiers 212 and 213, voltage dividers 215 and 217, and reference I/O driver cells ("reference I/O cells") 214 and 216.

An input signal 201 to be converted to a pair of LVDS output signals, namely signals 202 and 203, is input to I/O pair block 209. External resistors 204 and 205 may be coupled in series between output signals 202 and 203.

It should be appreciated that external resistors 204 and 205 may be composed from materials that are different than those used for resistors in corner bias circuit 200. However, as shall be more particularly appreciated from the following description, by tracking or locking Vod and Vos, Vod of an LVDS interface may be substantially improved. This locking may be done without using a current mirror for a base current, as was previously done, and without using a polyresistor to provide a base current for such current mirror, as was previously done. Moreover, this locking may be done without inputting a reference Vos into both differential amplifiers.

Reference voltage generator 210 generates a reference voltage 220 for Vos. Reference voltage generator 211 generates a reference voltage 221 for Vod. Reference voltage generator 210 may be a known reference voltage generator for generating Vos, and may use band gap voltage generation. Furthermore, it should be appreciated that reference voltage generator 211 may be coupled to reference voltage generator 210 to receive reference voltage signal 220 for generating reference voltage signal 221. Alternatively, a single reference voltage generator may be used having multiple output taps. This is because reference voltages 220 and 221 are respective set target values. Accordingly, any reference voltage generator or generators suitable for the purposes of providing Vod and Vos reference voltages as described herein may be used. Note that in some embodiments, one or both of the Vod and Vos reference voltages may be provided from an external source.

Reference voltage 220 is provided as an input to differential amplifier 212. Differential output voltage 227 of differential amplifier 212 is provided to a reference I/O cells 214 and 216 as a PMOS bias. Reference voltage 221 is provided as an input to differential amplifier 213. Differential output voltage 228 of differential amplifier 213 is provided to reference I/O cells 214 and 216 as an NMOS bias.

Responsive to differential output voltages 227 and 228 respectively from differential amplifiers 212 and 213, reference I/O cells 214 and 216 generate respective internal control voltages 222 and 223. Internal control voltage 222 is provided as an input to voltage divider 215 and as an input to reference I/O cell 216. Internal control voltage 223 is provided as an input to voltage divider 217 and as an input to reference I/O cell 214. Additionally, internal control voltage 223 is fed back and provided as a feedback input to differential amplifier 213.

Voltage dividers 215 and 217 are coupled in series at a middle node 218. Obtained or sourced from middle node 218 is middle voltage 224. Middle voltage 224 is provided as a feedback input to differential amplifier 212 to lock reference voltage 220 for Vos. In this configuration, reference I/O cells 214 and 216 in combination provide respective PMOS and NMOS reference voltages for I/O pair block 209, namely PMOS reference voltage 225 and NMOS reference voltage 226. Reference voltages 225 and 226 are provided as inputs to I/O pair block 209 for maintaining a differential output conversion of input signal 201 within an LVDS interface specification for providing output signals 202 and 203.

Figure 3:
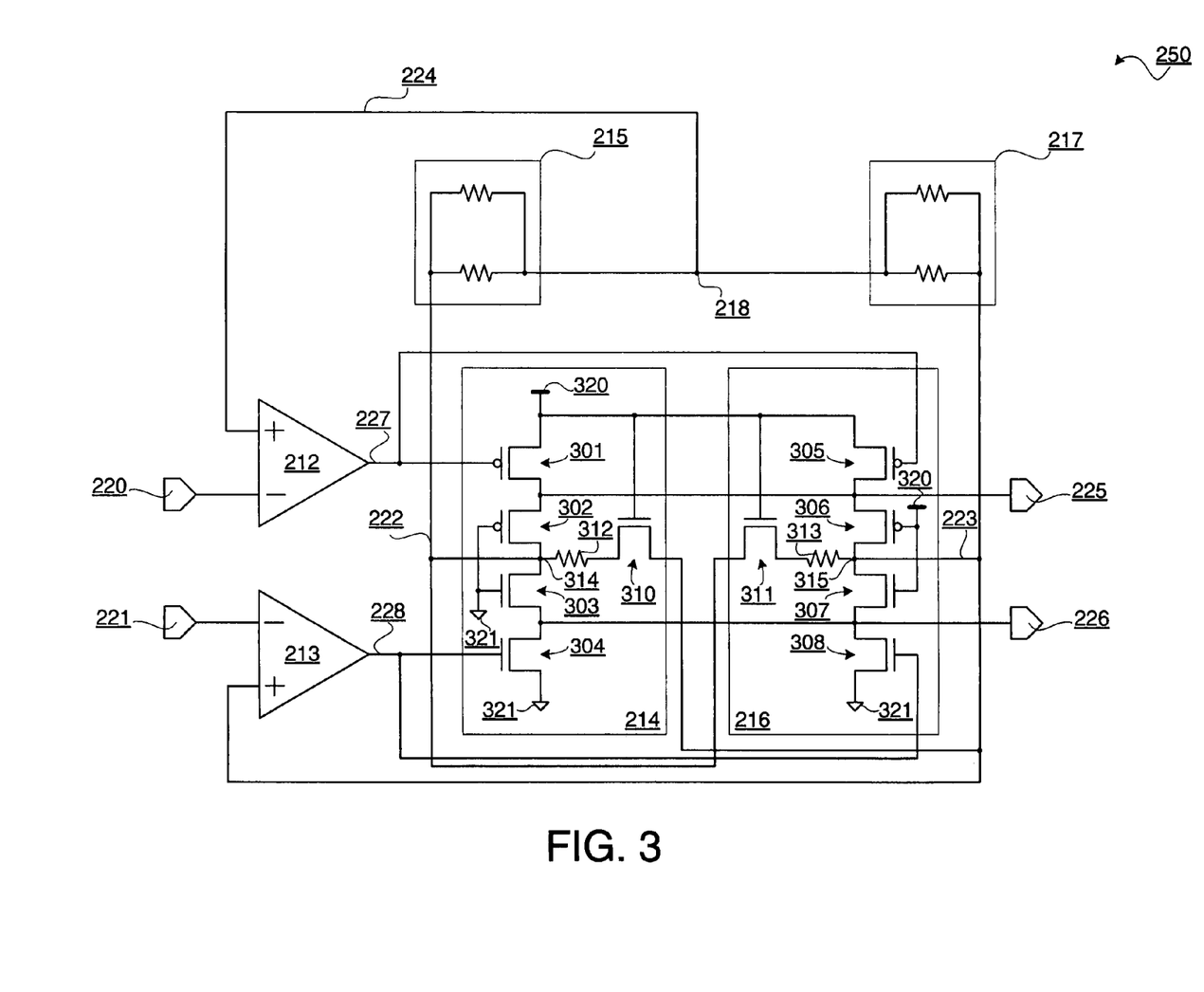
FIG. 3 is a schematic diagram depicting an exemplary embodiment of an implementation of a feedback control circuit.

FIG. 3 is a schematic diagram depicting an exemplary embodiment of an implementation of feedback control circuit 250 of FIG. 2. Reference voltages 220 and 221 are respectively input to minus terminals of differential amplifiers 212 and 213. Middle voltage 224 is provided as feedback input to a positive terminal of differential amplifier 212, and internal control voltage 223 is provided as a feedback input to a positive terminal of differential amplifier 213. Differential output voltage 227 of differential amplifier 212 is used to gate PMOS transistors 301 and 305 of reference I/O cells 214 and 216, respectively. Differential output voltage 228 of differential amplifier 213 is used to gate NMOS transistors 304 and 308 of reference I/O cells 214 and 216, respectively.

Source terminals of PMOS transistors 301 and 305 are coupled to a supply-side voltage level, such as VCCO 320 for example. Source terminals of NMOS transistors 304 and 308 are coupled to a ground-side voltage level, such as ground 321. Drain terminals of NMOS transistors 304 and 308 are coupled to one another to provide NMOS reference voltage 226. Drain terminals of PMOS transistors 301 and 305 are coupled together to provide PMOS reference voltage 225. Thus, differential output voltage 227 is provided to a current source, such as a current source formed of drive transistors 301 and 305 to provide pull-up voltage, and differential output voltage 228 is provided to another current source, such as a current source formed of drive transistors 304 and 308 to provide pull-down voltage.

To provide additional drive for pull-up transistors 301 and 305, as well as pull-down transistors 304 and 308, additional transistors, such as transistors 302, 303, 306, and 307, may be used as is known. In this embodiment, transistors 306 and 303 are off and transistors 302 and 307 are on, which means transistor 302 is to provide additional pull-up voltage and transistor 307 is to provide additional pull-down. Thus, for example, PMOS transistor 302 and NMOS transistor 303 are coupled in series between PMOS transistor 301 and NMOS transistor 304 with the gates of transistors 302 and 303 commonly coupled to ground 321 to provide additional pull-down voltage drive. Moreover, PMOS transistor 306 and NMOS transistor 307 are coupled in series between PMOS transistor 305 and NMOS transistor 308, with the gates of transistors 306 and 307 commonly coupled to VCCO 320 to provide additional pull-up voltage drive. Accordingly, it should be appreciated that transistors 302, 303, 306, and 307 are to mimic the actual I/O transistors associated therewith but for a DC model, namely a non-switching model.

Each reference I/O cell 214 and 216 includes a resistor, namely resistors 312 and 313 respectively, in series with a pass gate transistor, namely transistors 310 and 311 respectively. It should be appreciated that the resistance associated with the resistor and the pass gate transistor are in series. Furthermore, it should be appreciated that a resistor and pass gate transistor pair of one reference I/O cell is in parallel with the other resistor and pass gate transistor pair of the other I/O reference cell. Thus, the effective resistance of the series of resistance is added, and the combination of these added resistances are then again added as resistors in parallel. This sum total of such resistance over a range of PVT variations may substantially approximate termination resistance for an LVDS interface, namely termination resistance provided by resistors 204 and 205 of FIG. 2.

An output node 314 between series coupled drain terminals of transistors 302 and 303 is coupled to a terminal of resistor 312. Internal control voltage 222 is sourced from output node 314. A drain terminal of NMOS pass transistor 310 is coupled to another terminal of resistor 312. A source terminal of NMOS pass transistor 310 is coupled to receive internal control voltage 223.

An output node 315 between series coupled drain terminals of transistors 306 and 307 is coupled to a terminal of resistor 313. Internal control voltage 223 is sourced from output node 315. Another terminal of resistor 313 is coupled to a drain terminal of NMOS pass transistor 311. A source node of NMOS pass transistor 311 is coupled to receive internal control voltage 222. Notably, both pass transistors 310 and 311 are commonly gated to VCCO 320 to keep them in a saturated conductive state.

Accordingly, it should be appreciated that feedback control for a reference voltage for Vos for providing a PMOS bias, namely a voltage pull-up bias, is used for feedback control for a reference voltage for Vod for providing an NMOS bias, namely a voltage pull-down bias. Because Vos, which may have relatively little variation, is used to provide a tracking signal for Vod, variation of Vod may be reduced. Thus, feedback control is provided in part by cross-coupling internal control voltages 222 and 223, by using such internal control voltages 222 and 223 to provide middle voltage 224, and by using internal control voltage 223 to provide feedback input for a Vod reference voltage 221 for Vod locking. This Vod locking voltage is provided without using a current mirror and a polyresistor to provide a base current as was previously used, and thus limitations associated with use of such a current mirror may be avoided. Furthermore, it should be appreciated that as a result a more stable Vod may be obtained.

Figure 4:
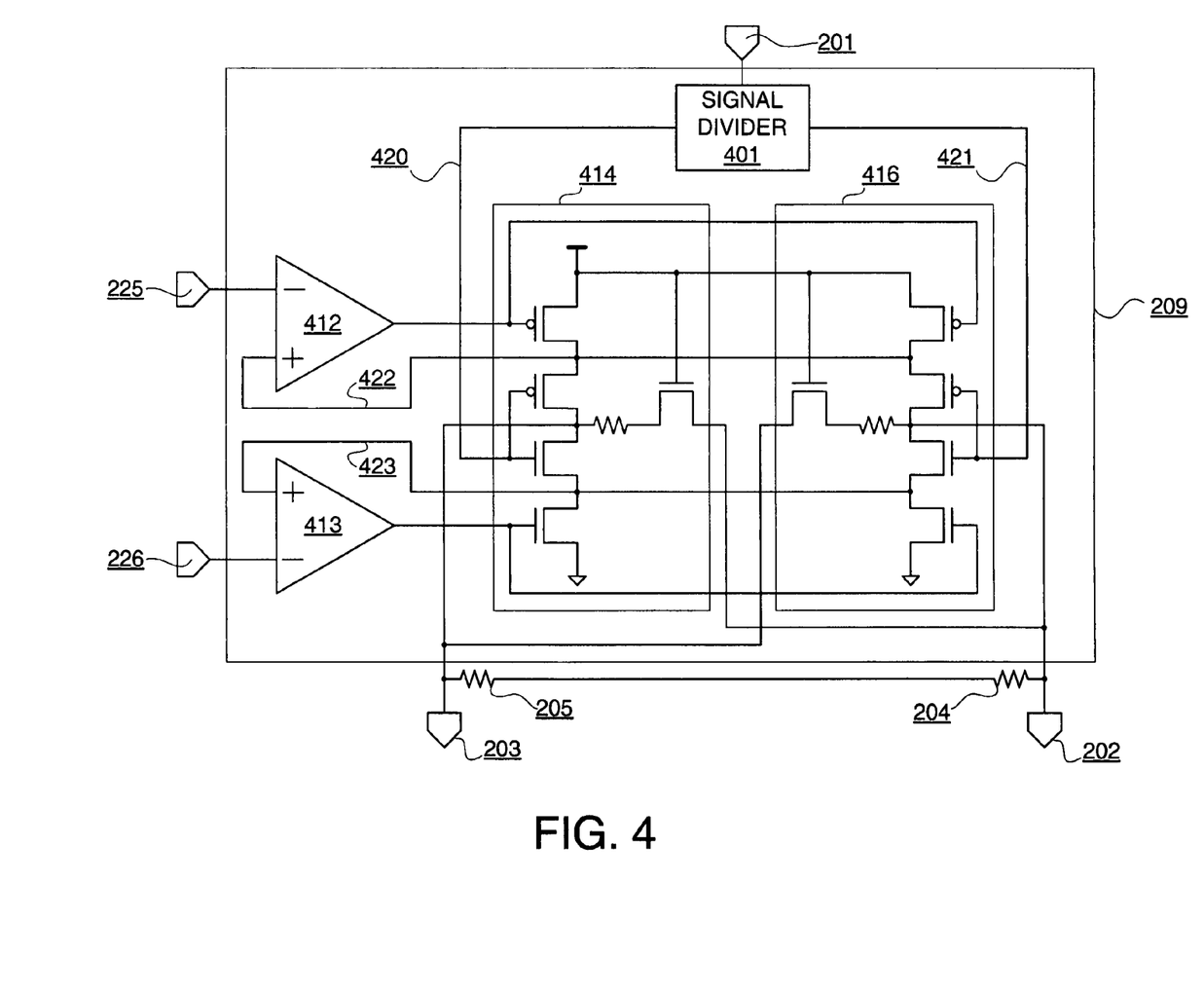
FIG. 4 is a block/schematic diagram depicting an exemplary embodiment of an implementation of the I/O pair block of FIG. 2 coupled to load resistors.

FIG. 4 is a block/schematic diagram depicting an exemplary embodiment of an implementation of an I/O pair block 209 coupled to load resistors 204 and 205. PMOS reference voltage 225 is provided to a minus input terminal of differential amplifier 412 and NMOS reference voltage 226 is provided to a minus input terminal of differential amplifier 413. Output of differential amplifiers 412 and 413 is provided to I/O driver cells 414 and 416, as is known. Other inputs to I/O driver cells 414 and 416 are from signal divider 401, as is known. Signal divider 401 is a known circuit for splitting input signal 201 into two separate signals having opposite voltage levels, namely input signals 420 and 421.

Input signal 420 is provided as an input to I/O driver cell 414, and input signal 421 is provided as an input to I/O driver cell 416. Output signal 422 from I/O driver cells 414 and 416 is provided as a feedback input signal to a positive input terminal of differential amplifier 412. Output signal 423 from I/O driver cells 414 and 416 is provided as a feedback input signal to a positive input terminal of differential amplifier 413. Accordingly, output signals 422 and 423 are respective feedback signals for comparisons with PMOS reference voltage 225 and NMOS reference voltage 226, respectively, for operation within LVDS specifications. As I/O pair block 209 is known, it is not described in unnecessary detail herein; however, it should be appreciated that input signal 201 conventionally carries information, and thus operation of I/O pair block 209 is described in terms of signaling. In contrast, feedback control circuit 250 of FIG. 2 for example is described in terms of voltages, as carrying of information generally is not to be involved in such feedback control circuit 250.

Output from I/O pair block 209, namely output signals 202 and 203, may be provided from an LVDS interface, as previously described. It should be appreciated that although only a single I/O pair block 209 is illustratively shown, multiple I/O pair blocks 209 may be coupled to receive PMOS reference voltage 225 and NMOS reference voltage 226 subject to fan out limitations.

For purposes of clarity by way of example and not limitation, numerical examples for providing output signals 202 and 203 are described below in accordance with a known LVDS signaling standard. However, it shall be appreciated from the description that follows that values other than the particular ones used to provide clarity of description may be used, and thus are within the scope of this disclosure.

With continuing reference to FIG. 4 and renewed reference to FIG. 3, each resistor 204 and 205 may be approximately 50 ohms. For a target Vos of approximately 1.25 V and a target Vod of approximately 350 mV, reference voltage 220 may be approximately 1.25 V. For this particular example, for middle voltage 224 being approximately 1.25 V, voltage drop across voltage dividers 215 and 217 from node 314 to node 315 may approximately 350 mV. More particularly, voltage drop across voltage divider 217 from node 315 to node 218 may be approximately 175 mV. Internal control voltage 223 may be targeted according to middle voltage 224 minus the voltage drop across voltage divider 217, or for this example 1.25 V minus 0.175 V, namely 1.075 V. Thus, reference voltage 221 may be set to be approximately 1.075 V.

Figure 5:
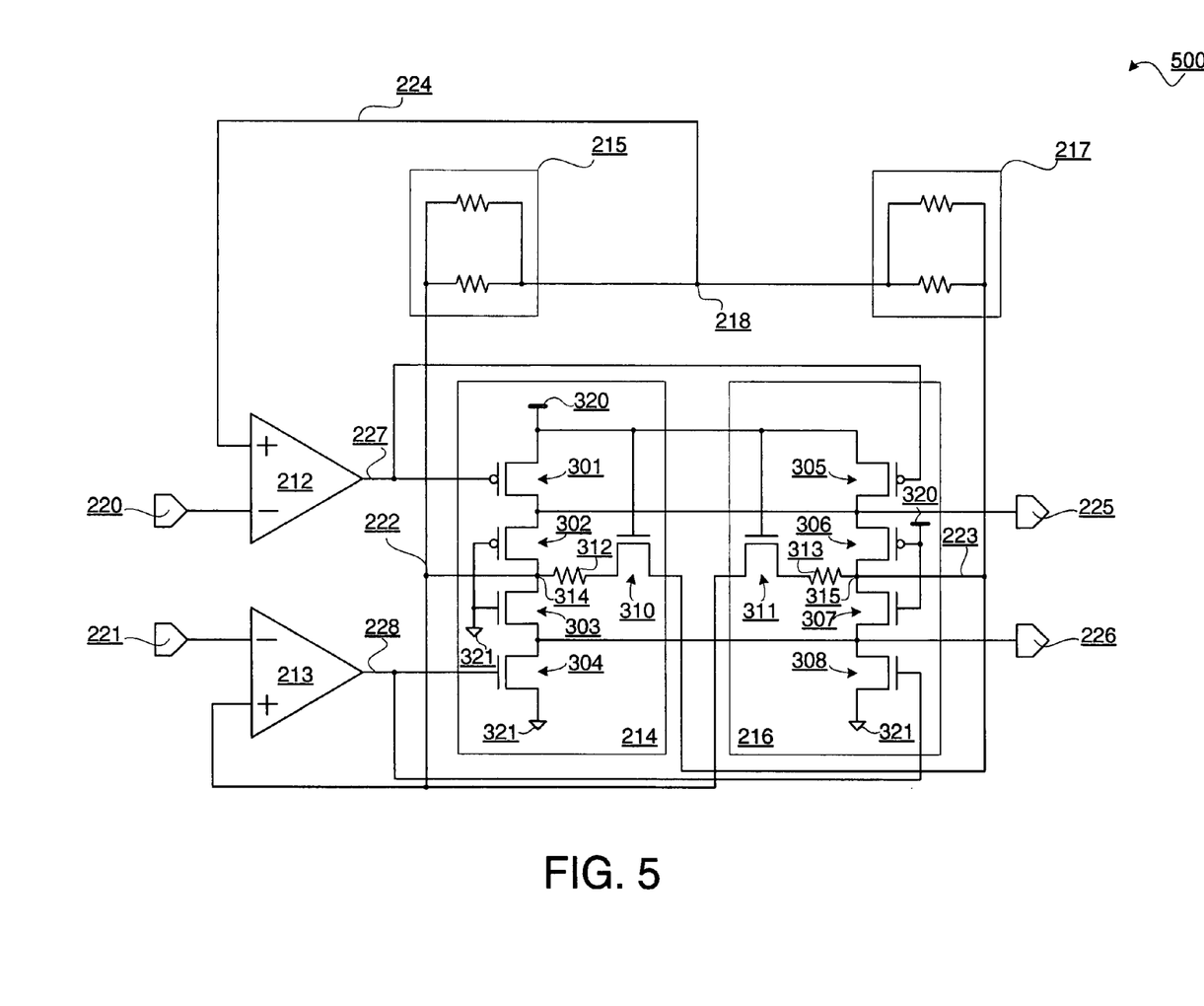
FIGS. 5, 6, and 7 are schematic diagrams depicting alternate exemplary embodiments of an implementation of a feedback control circuit.
Figure 6:
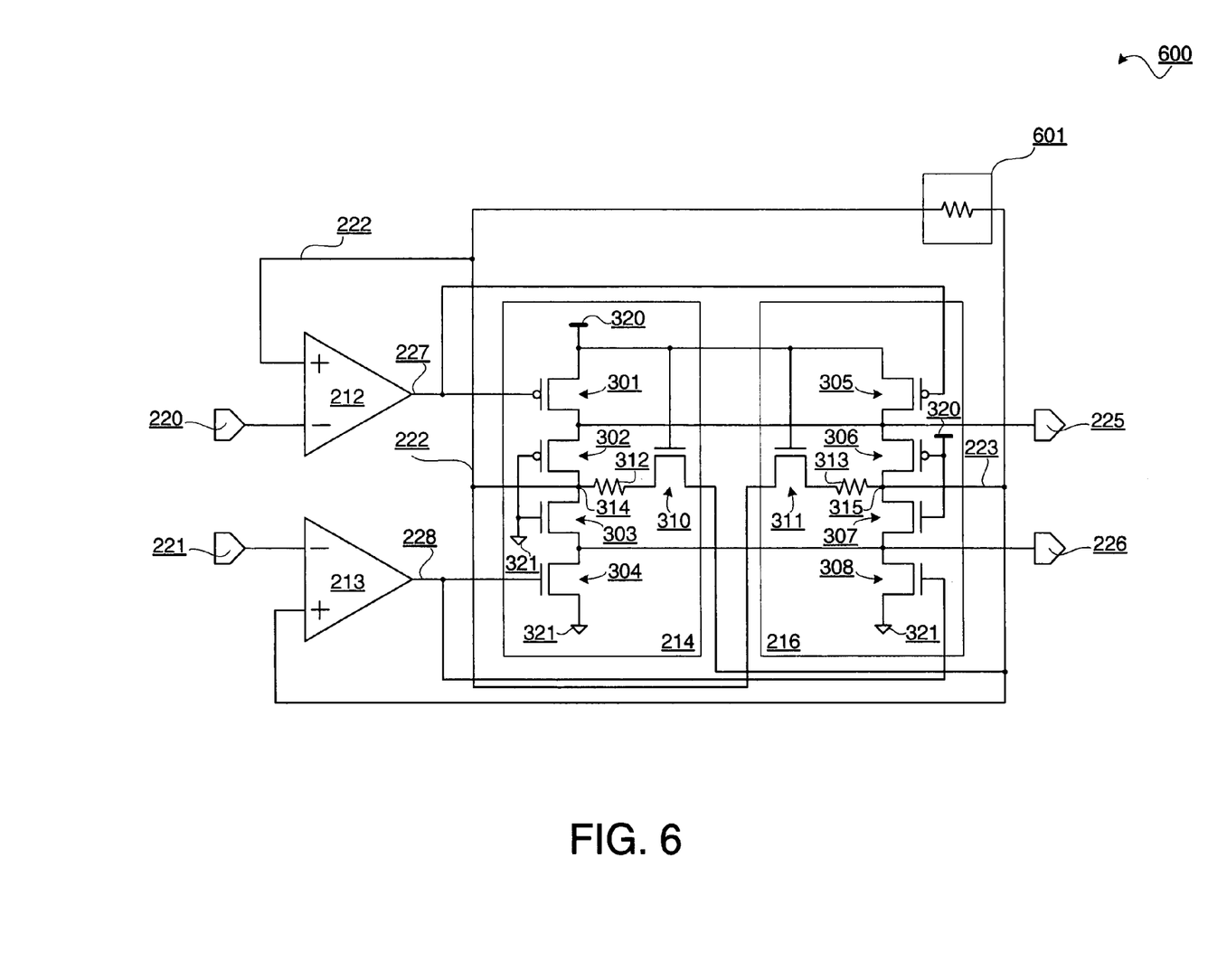
Figure 7:
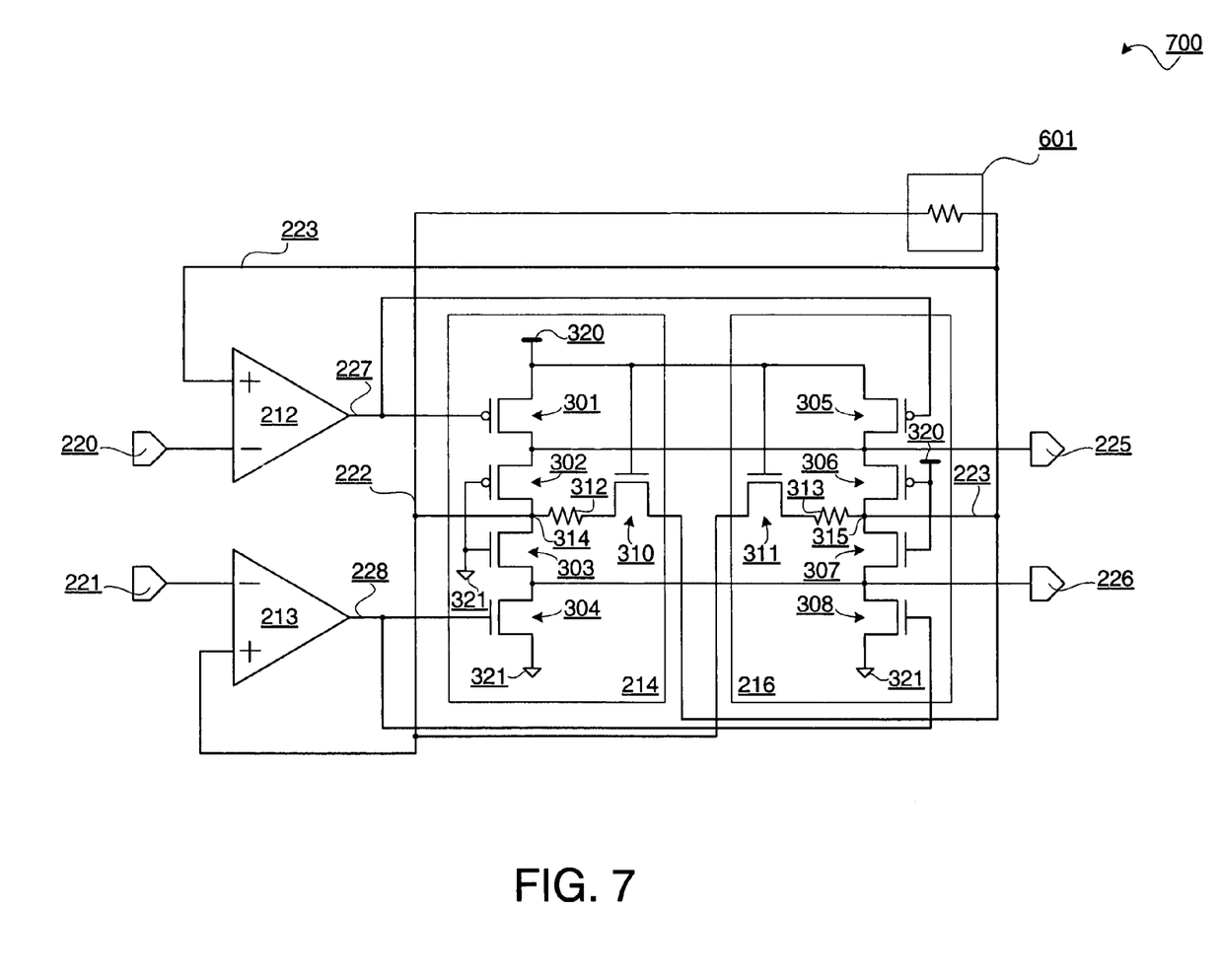

Alternatively, because voltages are internally controlled within feedback control circuit 250 and thus are self-consistent, other configurations of internal control voltages may be used as locking voltages, as indicated by the following alternative embodiments of FIGS. 5, 6 and 7.

FIG. 5 is a schematic diagram depicting an alternate exemplary embodiment of an implementation of a feedback control circuit 500. Feedback control circuit 500 is the same as feedback control circuit 250 of FIG. 2, except that internal control voltage 222, instead of internal control voltage 223, is provided as a feedback input to a plus terminal of differential amplifier 213. Continuing the above numerical example, internal control voltage 222 may be targeted according to middle voltage 224 plus the voltage drop across voltage divider 215, or for this example 1.25 V plus 0.175 V, namely 1.425 V. Thus, reference voltage 221 may be set to be approximately 1.425 V.

FIG. 6 is a schematic diagram depicting another alternate exemplary embodiment of an implementation of a feedback control circuit 600. Feedback control circuit 600 is the same as feedback control circuit 250 of FIG. 2, except that internal control voltage 222, instead of middle voltage 224, is provided as a feedback input to a plus terminal of differential amplifier 212. Accordingly, voltage dividers 215 and 217 of FIG. 2, which may be implemented as respective sets of resistors in parallel as indicated in FIG. 3, may be replaced with an impedance block 601.

Continuing the above numerical example, for each of resistors 204 and 205 of FIG. 2 being approximately 50 ohms, resistance of resistors in parallel forming voltage dividers 215 and 217 of FIG. 3 may each be approximately 50 ohms to correspond to resistance of resistors 204 and 205. However, it should be appreciated that a single resistor of approximately 100 ohms may be in impedance block 601 to approximate series resistance of resistors 204 and 205.

Moreover, for the exemplary implementation of FIG. 6, internal control voltage 222 may be targeted according to a targeted Vos of 1.25 V plus the voltage drop across half of resistor 601, or for this example 1.25 V plus 0.175 V, namely 1.425 V. Thus, reference voltage 220 may be set to be approximately 1.425 V.

FIG. 7 is a schematic diagram depicting still another alternate exemplary embodiment of an implementation of a feedback control circuit 700. Feedback control circuit 700 is the same as feedback control circuit 600 of FIG. 6, except that internal control voltage 223, instead of internal control voltage 222, is provided as a feedback input to a plus terminal of differential amplifier 212, and except that internal control voltage 222, instead of internal control voltage 223, is provided as a feedback input to a plus terminal of differential amplifier 213. Numerical values for reference voltages 220 and 221 for this embodiment may be generated in accordance with the prior description.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A reference voltage circuit for a differential interface, comprising:
a first reference voltage source configured to provide a reference swing voltage;
a second reference voltage source configured to provide a reference offset voltage;
a first differential amplifier coupled to receive the reference swing voltage and a first feedback voltage, the first differential amplifier configured to provide a p-bias voltage responsive to the reference swing voltage and the first feedback voltage;
a second differential amplifier coupled to receive the reference offset voltage and a second feedback voltage, the second differential amplifier configured to provide an n-bias voltage responsive to the reference offset voltage and the second feedback voltage;
a first reference input/output cell coupled to receive the p-bias voltage and the n-bias voltage, the first reference input/output cell configured to provide a first internal control voltage responsive in part to the p-bias voltage and the n-bias voltage;
a second reference input/output cell coupled to receive the p-bias voltage and the n-bias voltage, the second reference input/output cell configured to provide a second internal control voltage responsive in part to the p-bias voltage and the n-bias voltage;
the first reference input/output cell coupled to receive the second internal control voltage and configured to provide the first internal control voltage responsive in part to the second internal output voltage;
the second reference input/output cell coupled to receive the first internal control voltage and configured to provide the second internal control voltage responsive in part to the first internal control voltage;
an internal resistance configured to approximate transmission resistance, the internal resistance coupled to receive the first internal control voltage at one end and to receive the second internal control voltage at another end;
the first reference input/output cell and the second reference input/output cell coupled together at a first node for providing a pull-up side reference voltage; and
the first reference input/output cell and the second reference input/output cell coupled together at a second node for providing a pull-down side reference voltage.

2. The reference voltage circuit according to claim 1, wherein the internal resistance comprises a first voltage divider resistance and a second voltage divider resistance coupled in series at a third node.

3. The reference voltage circuit according to claim 2, wherein the first feedback voltage is sourced from the first node, and wherein the second feedback voltage is one of the first internal control voltage and the second internal control voltage.

4. The reference voltage circuit according to claim 3, wherein the first voltage divider resistance is coupled to receive the first internal control voltage; and
wherein the second voltage divider resistance is coupled to receive the second internal control voltage.

5. The reference voltage circuit according to claim 3, wherein the differential interface is a Low Voltage Differential Signaling interface.

6. The reference voltage circuit according to claim 1, wherein the first feedback voltage is one of the first internal control voltage and the second internal control voltage, and
wherein the second feedback voltage is one of the second internal control voltage and the first internal control voltage.

7. The reference voltage circuit according to claim 6, wherein the differential interface is a Low Voltage Differential Signaling interface.

8. A method for providing reference voltages for a differential interface, comprising:
obtaining a swing reference voltage and an offset reference voltage;
obtaining a swing feedback voltage and an offset feedback voltage;
differentially amplifying a first difference between the swing reference voltage and the swing feedback voltage to produce a first bias voltage;
differentially amplifying a second difference between the offset reference voltage and the offset feedback voltage to produce a second bias voltage;
gating a pull-up voltage responsive to the first bias voltage to at least in part provide a first control voltage and a first reference voltage;
gating a pull-down voltage responsive to the second bias voltage to at least in part provide a second control voltage and a second reference voltage;
providing the first control voltage and the second control voltage to a resistance; and
cross-coupling the first control voltage and the second control voltage via a first circuit and a second circuit respectively.

9. The method according to claim 8, further comprising voltage dividing a combination of the first control voltage and the second control voltage using the resistance to provide the swing feedback voltage, the resistance being two separate resistance blocks coupled in series.

10. The method according to claim 9, wherein the offset feedback voltage is obtained as one of the first control voltage and the second control voltage.

11. The method according to claim 10, wherein the differential interface is a Low Voltage Differential Signaling interface; and
wherein the resistance approximates an external transmission resistance.

12. The method according to claim 8, wherein the swing feedback voltage is obtained as one of the first control voltage and the second control voltage; and
wherein the offset feedback voltage is obtained as one of the second control voltage and the first control voltage.

13. The method according to claim 8, wherein the first control voltage is first source-drain and series resistance coupled via the first circuit for providing the second control voltage; and
wherein the second control voltage second is source-drain and series resistance coupled via the second circuit for providing the first control voltage.

14. The method according to claim 13, wherein the first reference voltage is a PMOS reference voltage; and
wherein the second reference voltage is an NMOS reference voltage.

15. The method according to claim 8, further comprising providing additional pull-down drive for providing the first control voltage.

16. The method according to claim 15, further comprising providing additional pull-up drive for providing the second control voltage.

17. An apparatus for providing reference voltages for a differential interface, comprising:
voltage source means for obtaining a swing reference voltage and an offset reference voltage;
voltage generation means for obtaining a swing feedback voltage and an offset feedback voltage;
first amplification means for differentially amplifying a first difference between the swing reference voltage and the swing feedback voltage to produce a first bias voltage;
second amplification means for differentially amplifying a second difference between the offset reference voltage and the offset feedback voltage to produce a second bias voltage;
the voltage generation means including first gating means for gating a pull-up voltage responsive to the first bias voltage to at least in part provide a first control voltage and a first reference voltage;
the voltage generation means including second gating means for gating a pull-down voltage responsive to the second bias voltage to at least in part provide a second control voltage and a second reference voltage, the second control voltage being the swing feedback voltage;
voltage divider means for voltage dividing the first control voltage and the second control voltage to provide the offset feedback voltage; and
first and second circuit means for respectively cross-coupling the first control voltage and the second control voltage.

18. The apparatus according to claim 17, wherein the first and second circuit means are each a resistor in source-drain series with a transistor.

* * * * *

UNITED STATES PATENT AND TRADEMARK OFFICE
CERTIFICATE OF CORRECTION

PATENT NO. : 7,236,004 B1
APPLICATION NO. : 11/238780
DATED : June 26, 2007
INVENTOR(S) : Shi-dong Zhou et al.

Page 1 of 1

It is certified that error appears in the above-identified patent and that said Letters Patent is hereby corrected as shown below:

On the Title page of the patent, item (73) Assignee "Xlinx, Inc., San Jose, CA (US)" should read --Xilinx, Inc., San Jose, CA (US)--

Signed and Sealed this
Thirteenth Day of August, 2013

Teresa Stanek Rea
*Acting Director of the United States Patent and Trademark Office*